United States Patent
Heath et al.

(10) Patent No.: US 9,181,391 B2
(45) Date of Patent: Nov. 10, 2015

(54) SINGLE-POT PROCESS FOR THE PRODUCTION OF POLYESTER-CO-CARBONATE POLYOLS

(71) Applicants: William H. Heath, Lake Jackson, TX (US); Harpreet Singh, Pearland, TX (US); Amarnath Singh, Pearland, TX (US); Jorge Jimenez, Lake Jackson, TX (US); Qiuyun Xu, Pearland, TX (US)

(72) Inventors: William H. Heath, Lake Jackson, TX (US); Harpreet Singh, Pearland, TX (US); Amarnath Singh, Pearland, TX (US); Jorge Jimenez, Lake Jackson, TX (US); Qiuyun Xu, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/373,955

(22) PCT Filed: Feb. 4, 2013

(86) PCT No.: PCT/US2013/024600
§ 371 (c)(1),
(2) Date: Jul. 23, 2014

(87) PCT Pub. No.: WO2013/119496
PCT Pub. Date: Aug. 15, 2013

(65) Prior Publication Data
US 2015/0018512 A1    Jan. 15, 2015

Related U.S. Application Data

(60) Provisional application No. 61/595,461, filed on Feb. 6, 2012.

(51) Int. Cl.
*C08G 64/30*    (2006.01)
*C08G 63/64*    (2006.01)

(52) U.S. Cl.
CPC .............. *C08G 64/305* (2013.01); *C08G 63/64* (2013.01)

(58) Field of Classification Search
CPC ................................ C08L 67/02; C08G 63/64
See application file for complete search history.

(56) References Cited

U.S. PATENT DOCUMENTS

| | | | |
|---|---|---|---|
| 4,267,120 A * | 5/1981 | Cuscurida et al. | ............ 558/267 |
| 5,116,929 A | 5/1992 | Greco et al. | |
| 5,929,193 A | 7/1999 | Greco | |

FOREIGN PATENT DOCUMENTS

| | | |
|---|---|---|
| EP | 1291374 A1 | 3/2003 |
| JP | 5-105746 A | 4/1993 |
| WO | 2008069725 A1 | 6/2008 |

OTHER PUBLICATIONS

PCT/US2013/024600,; International Search Report & Written Opinion of the International Searching Authority mailed Apr. 8, 2013.
PCT/US2013/024600, International Preliminary Report on Patentability mailed Aug. 21, 2014.
Dow Global Technologies LLC, EP Appln. No. 13704337.8, Communication pursuant to Rules 161(1) mailed Sep. 18, 2014.

* cited by examiner

*Primary Examiner* — Kuo-Liang Peng

(57) ABSTRACT

Polyester-co-carbonate polyols and methods for producing the same are provided. The method comprises reacting one or more alcohols having an OH functionality of two or more with one or more organic diacids to form a reaction mixture, adding a first amount of dialkyl carbonate to the reaction mixture to remove water remaining from the reaction mixture by azeotropic drying, adding a transesterification catalyst to the dialkyl carbonate containing reaction mixture and adding a second amount of dialkyl carbonate to the catalyst containing reaction mixture.

12 Claims, No Drawings

SINGLE-POT PROCESS FOR THE PRODUCTION OF POLYESTER-CO-CARBONATE POLYOLS

BACKGROUND

1. Field

Embodiments of the invention generally relate to polyester-co-carbonate polyols and methods for producing the same.

2. Description of the Related Art

Liquid polyols which have excellent UV, hydrolytic, oxidative and chemical stability are required for various coating, adhesive, sealant and elastomer (C.A.S.E.). Polyester-co-carbonate polyols are either amorphous or liquid at room temperature and have excellent hydrolytic stability.

There are two existing routes for producing polyester-co-carbonate polyols. The most efficient route produces the desired product in a single reaction vessel by combining a polyol (alkyl diol, alkyl ether diol oligomer, etc), dialkyl carbonate, lactone, and catalyst in a reaction vessel under transesterification conditions. However, this procedure requires the ester functionality be derived by ring opening of expensive lactone monomers and precludes the use of readily available diacids because the water generated would deactivate traditional transesterification catalysts. In another route, the incorporation of less expensive diester functionality requires transesterification of preformed polyesters and polycarbonates. Typical cycle times for the production of polyesters on an industrial scale are approximately 24 to 36 hours. The production of polycarbonate from dialkyl carbonates on an industrial scale requires approximately 24 to 48 hours. Transesterification of the products requires an additional 6 to 10 hours. Therefore, the total cycle time would be 54 to 94 hours and does not account for transportation costs if the two processes cannot be accommodated at the same facility.

Therefore there is a need for more efficient and inexpensive methods for producing polyester-co-carbonate polyols.

SUMMARY

Embodiments of the invention generally relate to polyester-co-carbonate polyols and methods for producing the same. In one embodiment, a method for producing a polyester-co-carbonate polyol is provided. The method comprises reacting one or more alcohols having an OH functionality of two or more with one or more organic diacids to form a reaction mixture, adding a first amount of dialkyl carbonate to the reaction mixture to remove water remaining from the reaction mixture by azeotropic drying, adding a transesterification catalyst to the dialkyl carbonate containing reaction mixture and adding a second amount of dialkyl carbonate to the catalyst containing reaction mixture.

DETAILED DESCRIPTION

Embodiments of the invention generally relate to polyester-co-carbonate polyols and methods for producing the same. Polyester-co-carbonate polyols are typically produced by either a single-pot process utilizing ring-opening polymerization of lactones in the presence of a dialkyl carbonate and polyol (diol) or by transesterification of preformed polyesters and polycarbonates. Embodiments of the invention generally provide processes for the production of polyester-co-carbonate copolymers from diacids in a single reaction vessel without isolation of either a polyester or polycarbonate component. This 'one-pot' process is characterized by the following: an (i) esterification step with an organic diacid (OH/acid≥2), (ii) use of a carbonate containing compound (e.g., a dialkyl carbonate such as dimethyl carbonate (DMC)) as both solvent/reactant to reduce the remaining water content (e.g., <2,000 ppm), and (iii) addition of catalyst and carbonate containing compound to reach target hydroxyl equivalent weight (HEW). This process is amenable to traditional transesterification catalysts and provides the potential to reduce the total cycle time of the "two-pot" process from 54 to 94 hours down to the 20 to 40 hour range, which equates to a production cost reduction of approximately 25% to 35% based on the batch size.

In certain embodiments described herein one or more alcohols having an OH functionality of two or more is combined with an organic diacid and heated for approximately 1 to 3 hours to esterify a large percentage of the acid groups present. A fraction of the carbonate containing compound required to form the polycarbonate (~20%) is then added over a period of 30 to 60 minutes to azeotrope off water and drive the reaction to completion. That is, the carbonate containing compound will form an azeotrope with water produced from the esterification reaction and due to the temperature of the reaction mixture, the resulting azeotrope will flash-off. This prevents the deactivation of the transesterification catalyst and allows polycarbonate formation to commence after a period of 2 to 4 hours. Through the use of an azeotropic drying step the esterification time is significantly reduced and polyester-co-carbonate polyols can be produced in a single reactor from inexpensive organic diacids.

Certain embodiments described herein are useful in preparing polyester-co-carbonate polyols with a number average molecular weight ($M_n$) from 500-5,000 g/mol and a nominal OH functionality from 2.0 to 5. Exemplary diols include linear or cycloaliphatic diols, oligoethers, dimer alcohols, and aromatic diols. Exemplary organic diacids are aliphatic diacids including but not limited to adipic acid, succinic acid, pimelic acid, maleic acid, and malonic acid. Exemplary alkyl carbonate containing compounds can be selected from dialkyl carbonates (e.g., dimethyl, diethyl, diallyl), or cyclic carbonates (e.g., propyl carbonate).

In one embodiment, a method for producing a polyester-co-carbonate polyol is provided. The method comprises reacting one or more alcohols having an OH functionality of two or more with an organic diacid to esterify a large percentage of the acid groups present, adding a first amount of at least one dialkyl carbonate compound to the reaction mixture, removing water remaining from the reaction mixture by azeotropic drying, adding a transesterification catalyst to the carbonate containing reaction mixture, and adding a second amount of the at least one dialkyl carbonate compound to the catalyst containing reaction mixture.

The method comprises reacting one or more alcohols having an OH functionality of two or more with one or more organic diacids to esterify a large percentage of the acid groups present to form a reaction mixture.

Temperatures for the initial transesterification reaction may be between 120 degrees Celsius and 240 degrees Celsius. The transesterification reaction is typically performed at atmospheric pressure but lower or higher pressures may be used. Vacuum may be applied to remove any volatiles. Reaction time depends on variables such as temperature, pressure, type of catalyst and catalyst concentration.

The reaction mixture includes one or more alcohols having an OH functionality of 2 or more. Examples of difunctional and multifunctional alcohols include diethylene glycol, propylene glycol, 1,2-butylene glycol, 2,3-butylene glycol, 1,3-propanediol, 1,3-butanediol, 1,4-butanediol, 1,6-hexanediol, neopentylglycol, 1,2-ethylhexyldiol, 1,5-pentanediol, 1,10-decanediol, 1,3-cyclohexanedimethanol, 1,4-cyclohexanedimethanol (CHDM), glycerine, trimethylolpropane and combinations thereof.

The one or more alcohols having an OH functionality of two or more may comprise at least 5 wt. %, 10 wt. %, 15 wt. %, 20 wt. %, 25 wt. %, 30 wt. %, 35 wt. %, 40 wt. %, or 45 wt. % of the reaction mixture. The one or more alcohols may comprise up to 10 wt. %, 15 wt. %, 20 wt. %, 25 wt. %, 30 wt. %, 35 wt. %, 40 wt. %, 45 wt. %, 50 wt. %, 55 wt. %, or 60 wt. % of the reaction mixture.

The reaction mixture includes one or more organic diacids. The one or more organic diacids may include at least one of aliphatic acids and aromatic acids. The one or more organic diacids (ii) may be selected from the group comprising for example, phthalic acid, isophthalic acid, terephthalic acid, trimellitic acid, tetrahydrophthalic acid, hexahydrophthalic acid, tetrachlorophthalic acid, oxalic acid, adipic acid, azelaic acid, sebacic acid, succinic acid, malic acid, glutaric acid, malonic acid, pimelic acid, suberic acid, 2,2-dimethylsuccinic acid, 3,3-dimethylglutaric acid, 2,2-dimethylglutaric acid, maleic acid, fumaric acid, itaconic acid, fatty acids (linolic, oleic and the like) and combinations thereof. Anhydrides of the above acids, where they exist, can also be employed. In addition, hydroxy acids such as tartaric acid and dimethylolpropionic acid may be used. If a triol or higher hydric alcohol is used, a monocarboxylic acid, such as acetic acid, may be used in the preparation of the polyester polyol oligomer, and for some purposes, such as polyester polyol oligomer may be desirable. Preferably, the one or more organic diacids is adipic acid.

The one or more organic diacids (ii) may comprise at least 5 wt. %, 10 wt. %, 15 wt. %, 20 wt. %, 25 wt. %, 30 wt. %, 35 wt. %, 40 wt. %, 45 wt. %, 50 wt. %, or 55 wt. % of the reaction mixture. The one or more organic diacids may comprise up to 10 wt. %, 15 wt. %, 20 wt. %, 25 wt. %, 30 wt. %, 35 wt. %, 40 wt. %, 45 wt. %, 50 wt. %, 55 wt. %, or 60 wt. % of the reaction mixture.

In certain embodiments where the polyester-co-carbonate polyol is a hydrophobic polyester-co-carbonate polyol, the reaction mixture may further include at least one hydrophobic monomer. The at least one hydrophobic monomer may include at least one of one or more dimer acids, dimer diols, hydroxy stearic acid, one or more hydroxymethylated fatty acids or esters thereof, or combinations thereof.

The one or more dimer acids may include dimer acids containing from about 18 to about 44 carbon atoms. Dimer acids (and esters thereof) are a well known commercially available class of dicarboxylic acids (or esters). They are normally prepared by dimerizing unsaturated long chain aliphatic monocarboxylic acids, usually of 13 to 22 carbon atoms, or their esters (alkyl esters). The dimer acid material will usually contain 26 to 44 carbon atoms. Particularly, examples include dimer acids (or esters) derived from $C_{18}$ and $C_{22}$ unsaturated monocarboxylic acids (or esters) which will yield, respectively, $C_{36}$ and $C_{44}$ dimer acids (or esters). Dimer acids derived from $C_{18}$ unsaturated acids, which include acids such as linoleic and linolenic are particularly well known (yielding $C_{36}$ dimer acids). For example, DELTA 9, 11 and DELTA 9, 12 linoleic acids can dimerize to a cyclic unsaturated structure (although this is only one possible structure; other structures, including acyclic structures are also possible). The dimer acid products may also contain a proportion of trimer acids ($C_{54}$ acids when using $C_{18}$ starting acids), possibly even higher oligomers and also small amounts of the monomer acids. Several different grades of dimer acids are available from commercial sources and these differ from each other primarily in the amount of monobasic and trimer acid fractions and the degree of unsaturation. The various dimers may be selected from crude grade dimer acids, hydrogenated dimer acids, purified/hydrogenated dimer acids, and combinations thereof.

Exemplary dimer acids are available from Croda Inc. under the tradename PRIPOL™ acids and from Cognis under the tradename EMPOL® acids. Suitable commercially available products of that type include PRIPOL™ 1017 (C36 dimer fatty acid), PRIPOL™ 1013 (C36 distilled dimer fatty acid), and PRIPOL™ 1006 (hydrogenated C36 dimer fatty acid).

The dimer diols may include dimer acids which have been reduced to the corresponding dimer diols. Exemplary dimer diols are available from Croda Inc. under the tradename PRIPOL™ diols. Suitable commercially available products of that type include PRIPOL™ 2030 and PRIPOL™ 2033.

The hydroxy stearic acid may include 12 hydroxy stearic acid (12-HSA). Saturated monobasic secondary hydroxy fatty acids, especially 12-HSA, are commercially available.

The method further comprises adding a first amount of a carbonate containing compound (e.g., a dialkyl carbonate such as dimethyl carbonate (DMC)) to the reaction mixture to remove water remaining from the reaction mixture by azeotropic drying.

The at least one carbonate containing compound may be selected from alkylene carbonates, dialkyl carbonates, and dioxolanones Examples of suitable alkylene carbonates may include ethylene carbonate, trimethylene carbonate, 1,2-propylene carbonate, 5-methyl-1,3-dioxane-2-one, 1,2-butylene carbonate, 1,3-butylene carbonate, 1,2-pentylene carbonate, and the like. Examples of suitable dialkyl carbonates may include dimethyl carbonate, diethyl carbonate, di-n-butyl carbonate.

The first amount of the at least one carbonate containing compound may be between 5 wt. % and 30 wt. % of the total amount of the at least one carbonate containing compound added to the reaction mixture. The total amount of the at least one carbonate containing compound added to the reaction mixture includes the first amount of the at least one carbonate containing compound and the second amount of the at least one carbonate containing compound. The first amount of the at least one carbonate containing compound may comprise at least 5 wt. %, 10 wt. %, 15 wt. %, 20 wt. %, or 25 wt. % of the total amount of the at least one carbonate containing compound added to the reaction mixture. The first amount of the at least one carbonate containing compound may comprise up to 10 wt. %, 15 wt. %, 20 wt. %, 25 wt. %, or 30 wt. % of the total amount of the at least one carbonate containing compound added to the reaction mixture.

The at least one carbonate containing compound may be added to the reaction mixture in an amount to reduce the water content in the reaction mixture to less than 2,000 ppm, 1,000 ppm or 600 ppm water. The use of a carbonate containing compound as a solvent for formation of an azeotrope with water and as a reactant, allows for formation of the polyester-co-carbonate polyol without the need to isolate the polyester from the initial reaction mixture.

The method further comprises adding a transesterification catalyst to the carbonate containing reaction mixture. The transesterification catalyst is added to the carbonate containing reaction mixture after the azeotropic drying step. The transesterification catatlyst may be an organometallic catalyst. The transesterification catalyst may be selected from the group comprising terbium-based catalysts, titanium-based catalysts, ytterbium-based catalysts, and tin-based catalysts. Of these catalysts, it is preferred to use titanium compounds such as titanium tetrabutoxide, titanium tetra-n-propoxide, titanium tetra-isopropoxide, titanium 2-ethyl hexanoate, and titanium acetylacetonate and tin compounds such as di-n-butyltin dilaurate, di-n-butyltin oxide, and dibutyltin diacetate. Exemplary titanium catalysts are available from DUPONT™ under the tradename TYZOR® titanium acetylacetonates. Suitable commercially available products of that type include TYZOR® AA-105.

The amount of catalyst present depends on the type of catalyst and the amount of catalyst. In certain embodiments described herein, the transesterification catalyst is used in concentrations (expressed as percent by weight of metal with respect to the aliphatic diol used) of up to 1,000 ppm (0.1%), preferably between 1 ppm and 500 ppm (0.05%), most preferably between 5 ppm and 100 ppm (0.01%). After the reaction is complete, the catalyst may be left in the product, or can be separated, neutralized or masked.

Temperatures for the transesterification reaction may be between 120 degrees Celsius and 240 degrees Celsius. The transesterification reaction is typically performed at atmospheric pressure but lower or higher pressures may be used. Vacuum may be applied at the end of the activation cycle to remove any volatiles. Reaction time depends on variables such as temperature, pressure, type of catalyst and catalyst concentration.

The method further comprises adding a second amount of the at least one carbonate containing compound to the catalyst containing reaction mixture.

The second amount of the carbonate containing compound may be between 70 wt. % and 95 wt. % of the total amount of carbonate containing compound added to the reaction mixture. The second amount of carbonate containing compound may comprise at least 70 wt. %, 75 wt. %, 80 wt. %, 85 wt. %, or 90 wt. % of the total amount of carbonate containing compound added to the reaction mixture. The second amount of carbonate containing compound may comprise up to 75 wt. %, 80 wt. %, 85 wt. %, 90 wt. %, or 95 wt. % of the total amount of carbonate containing compound added to the reaction mixture.

Determination of the total amount of carbonate containing compound can be determined by those skilled in the art. For example, the total amount of carbonate containing compound can be calculated by determining the appropriate ratio of carbonate functionality to alcohol functionality to obtain the desired number average molecular weight of the polyester-co-carbonate polyol. The ratio can be calculated, for example, using a modified Carothers equation. An excess of carbonate containing compound is generally added beyond the theoretical amount calculated to give the desired average molecular weight to account for losses from azeotropic distillation with liberated alcohol. An approximation of excess amount material to be added can be based upon known or experimentally determined azeotrope ratios. The distillation efficiency of the reactor system may require a further excess due to deviation from optimum azeotropic ratios of the liberate alcohol and carbonate containing compound.

In another embodiment, a prepolymer or elastomer is provided. The elastomer or prepolymer is prepared from a reaction system comprising (a) a polyester-co-carbonate polyol produced according to the methods described herein and (b) one or more organic polyisocyanates.

Component (b) may comprise one or more organic polyisocyanate components. The isocyanate functionality is preferably from about 1.9 to 4, and more preferably from 1.9 to 3.5 and especially from 2.0 to 3.3. The one or more organic polyisocyanate components may be selected from the group comprising a polymeric polyisocyanate, aromatic isocyanate, cycloaliphatic isocyanate, or aliphatic isocyanates. Exemplary polyisocyanates include, for example, m-phenylene diisocyanate, 2,4- and/or 2,6-toluene diisocyanate (TDI), the various isomers of diphenylmethanediisocyanate (MDI), and polyisocyanates having more than 2 isocyanate groups, preferably MDI and derivatives of MDI such as biuret-modified "liquid" MDI products and polymeric MDI (PMDI), 1,3 and 1,4-(bis isocyanatomethyl)cyclohexane, isophorone diisocyanate (IPDI), hexamethylene diisocyanate (HDI), bis(4-isocyanatocyclohexyl)methane or 4,4' dimethylene dicyclohexyl diisocyanate (H12MDI), and combinations thereof, as well as mixtures of the 2,4- and 2,6-isomers of TDI, with the former most preferred in the practice of the invention. A 65/35 weight percent mixture of the 2,4 isomer to the 2,6 TDI isomer is typically used, but the 80/20 weight percent mixture of the 2,4 isomer to the 2,6 TDI isomer is also useful in the practice of this invention and is preferred based on availability. Suitable TDI products are available under the trade name VORANATE™ which is available from The Dow Chemical Company. Preferred isocyanates include methylene diphenyl diisocyanate (MDI) and or its polymeric form (PMDI) for producing the prepolymers described herein. MDI products are available from The Dow Chemical Company under the trade names PAPI®, VORANATE® and ISONATE®. Suitable commercially available products of that type include PAPI™ 94, PAPI™ 27, and ISONATE M125 which are also available from The Dow Chemical Company.

The reaction system may further comprise additional components including, for example, chain extenders and catalysts.

Additives such as surface active agents, antistatic agents, plasticizers, fillers, flame retardants, pigments, stabilizers such as antioxidants, fungistatic and bacteriostatic substances and the like are optionally used in the reaction system.

EXAMPLES

Objects and advantages of the embodiments described herein are further illustrated by the following examples. The particular materials and amounts thereof, as well as other conditions and details, recited in these examples should not be used to limit the embodiments described herein.

| A description of the raw materials used in the examples is as follows: | |
| --- | --- |
| Adipic Acid (AA) | Adipic acid (AA) is commercially available from SIGMA ALDRICH ®. |
| 1,4-butane diol (BDO) | An alkane diol (99%) which is commercially available from SIGMA-ALDRICH ®. |
| 1,4-hexane diol (HDO) | An alkane diol (99%) which is commercially available from SIGMA-ALDRICH ®. |
| Dibutyl phosphate | Commercially available from SIGMA-ALDRICH ®. |
| Diethylene glycol | Commercially available from SIGMA-ALDRICH ®. |
| Dimethyl carbonate (DMC) | Dimethyl carbonate (DMC) (99.9%) is commercially available from KOWA American Corporation. |
| Glycerin | Commercially available from SIGMA-ALDRICH ®. |
| TYZOR ® TPT | Tetra-isopropyl titanate catalyst which is a reactive organic alkoxy titanate with 100% active content commercially available from DuPont. |

One Pot Synthesis—Pilot Scale

Butanediol (35.335 kg), diethylene glycol (21.367 kg), glycerin (1.343 kg) and adipic acid (29.693 kg) were charged into a 30 gallon reactor equipped with hot oil temperature control, mechanical stirring, sparge ring, and distillation column with water cooling. The reactor was degassed three times with nitrogen and swept with nitrogen. The reactor temperature was increased to 210° C. Water evolution began after 30 minutes of reaction and the overhead temperature rose to 114° C. The jacket temperature was reduced to 185° C. After 3 hours the reactor water content was 5,300 ppm by KF analysis. Dimethyl carbonate (19 lbs, 8.618 kg) was added over 135 minutes. The water content of the reactor was 1165 ppm after drying.

TYZOR® TPT catalyst (36 g) was added and DMC addition resumed. DMC (35.018 kg) was added over 8.5 hours. The reaction was heated for one additional hour before introducing nitrogen sparge at 0.5 scfm for 1 hour. The reaction was continued under reduced pressure of 250 mmHg for 4 hours and the resulting $M_n$ was 2,038 g/mol relative to PEG standards and OH # was 17.28 mg KOH/g. Diethylene glycol (966 g) and butanediol (1,582 g) were added and the reactor was stirred at 185° C. under ambient pressure for 30 minutes, then the pressure was reduced to 250 mmHg for 90 minutes. The resulting $M_n$ was 1,942 g/mol and OH # was 52.6 mg KOH/g. The total reaction time was 21 hrs.

One Pot Synthesis—Laboratory Scale

Adipic acid (65.50 g), glycerine (2.92 g), diethylene glycol (47.7 g), and 1,4-butanediol (77.6 g) were added to a round-bottom flask equipped with a mechanical stirrer, Dean-Stark trap, thermocouple, and nitrogen inlet. The solution was heated to 210° C. and stirred under a nitrogen blanket for 180 minutes to effect esterification and remove generated water (14.82 g) by distillation. After this time the water content of the reaction solution was 5,700 ppm as determined by KF titration. The heating mantle temperature was set to 195° C. and DMC (30 g) was added to the flask over 30 minutes. The reaction was held at 195° C. for an additional 30 minutes to remove as much DMC/water as possible. The water content of the flask after drying was 1,600 ppm. A 10 wt % TYZOR® TPT solution in isopropyl alcohol (742 mg) was added via syringe. DMC (128 g) was added dropwise via peristaltic pump over 300 minutes while continually removing liberated methanol and excess DMC. The reaction temperature was increased to 205° C. and a nitrogen sparge was introduced. After 9 hours the $M_n$ was 2,234 g/mol relative to PEG standards and the OH # was 37.2 mg KOH/g. The sparging was continued for another hour and the $M_n$ increased to 2,489 g/mol and OH # reduced to 30.13 mg KOH/g. BDO (2.2516 g) and DEG (1.3467 g) were added to the reaction and sparging was continued for 90 minutes. The $M_n$ was 1,960 g/mol and OH #54.9 mg KOH/g. The reaction was cooled to 100° C., dibutyl phosphate (120 mg) was added, and the reaction was stirred for 1 hour before cooling to room temperature.

Two Step (Prior Art) Synthesis 150 g (1.271 mol, 1 Eq) of 1,5-hexanediol and 83.5 g (0.572 mol, 0.45 Eq) of adipic acid (SIGMA ALDRICH®>99%) were added to a 500 mL 4-neck round-bottom flask (RBF). The RBF was equipped with a short-path distillation head, mechanical stirrer, and thermocouple for temperature control. The flask was heated to 160° C. After 75 minutes 8.96 g of overheads were collected (OH A). The pot temperature was set to 180° C. Water was still coming off, but slowly. After 180 minutes, 6.55 g more water was collected (OH B). The pot temperature was set to 200° C. After 240 minutes 1.83 g of water was collected (OH C). After 360 minutes, the pot temperature was set to 210° C. to finish the reaction. After 540 minutes, the reaction was cooled to room temperature. The distilled water smelled of HDO so the fractions were analyzed by GC. No HDO was found by GC.

The next day the short-path distillation head was replaced with a Dean-Stark trap and 42 mg of TYZOR® TPT was added via syringe after heating to 150° C. 0.52 molar equivalents of DMC (26.76 g) were added dropwise via peristaltic pump. This charge equates to 1.5 molar equivalents with respect to the theoretical oligomer weight produced assuming 100% conversion. After 35 minutes, ~16.75 g of DMC had been added and no distillation had occurred. The drip was stopped and the pot temperature was increased to 165° C. After 45 minutes the overhead temperature was 76° C., but began dropping right away so the drip was resumed. Upon resuming drip the overhead temp returned to 76-77° C. After 60 minutes, 3.27 g (overhead-1 (OH1)) was collected and the pot temperature was increased to 170° C. OH1 was biphasic indicating water evolution was not complete before adding catalyst. After 75 minutes, the drip was complete. 6.09 g of overhead (OH2) was collected and still biphasic and the overhead temp was still 76.8° C.

An additional 50 mg of TYZOR® TPT was added. At 80 minutes, 10.3 g of DMC was added dropwise. At 85 minutes the overhead temp was 71° C. At 110 minutes, the addition was complete and the overhead temp began to decrease so the pot temperature was increased to 180° C. 6.8 g of overhead (OH3) was collected. At 120 minutes, the temperature was increased to 185° C. because the overhead began to drop again. At 225 minutes, 4.25 g of overhead (OH4) was collected and the pot temperature was increased to 195° C. and nitrogen sparge was begun. At 400 minutes 5.5 g of overhead was collected (OH5). The reaction was cooled to room temperature. After adding the second equivalent of TYZOR® the reaction turned light pink.

The overhead fractions were analyzed by GC to determine composition. The results indicated that there was very little methanol generation (indicating no transesterification) at the beginning of the reaction before the second catalyst charge was made.

While the foregoing is directed to embodiments of the invention, other and further embodiments of the invention may be devised without departing from the basic scope thereof.

What is claimed is:

1. A method for producing a polyester-co-carbonate polyol comprising:
   reacting one or more alcohols having an OH functionality of two or more with one or more organic diacids to form a reaction mixture;
   azeotropic drying of the reaction mixture by adding a first amount of dialkyl carbonate to the reaction mixture thereby forming a dialkyl carbonate-containing reaction mixture;
   adding a transesterification catalyst to the dialkyl carbonate containing reaction mixture; and
   adding a second amount of dialkyl carbonate to the catalyst containing reaction mixture.

2. The method of claim 1, wherein the polyester-co-carbonate polyol has a number average molecular weight between 500 and 5,000 grams/mole and a nominal functionality between 2.0 and 5.0.

3. The method of claim 1, wherein the one or more alcohols having an OH functionality of two or more is selected from the group comprising cycloaliphatic diols, oligoethers, dimer alcohols, and aromatic diols.

4. The method of claim 1, wherein the one or more organic diacids are selected from phthalic acid, isophthalic acid, terephthalic acid, trimellitic acid, tetrahydrophthalic acid, hexahydrophthalic acid, tetrachlorophthalic acid, oxalic acid, adipic acid, azelaic acid, sebacic acid, succinic acid, malic acid, glutaric acid, malonic acid, pimelic acid, suberic acid, 2,2-dimethylsuccinic acid, 3,3-dimethylglutaric acid, 2,2-dimethylglutaric acid, maleic acid, fumaric acid, itaconic acid, fatty acids, and combinations thereof.

5. The method of claim 1, wherein the one or more alcohols having an OH functionality of two or more is selected from diethylene glycol, propylene glycol, 1,2-butylene glycol, 2,3-butylene glycol, 1,3-propanediol, 1,3-butanediol, 1,4-butanediol, 1,6-hexanediol, neopentylglycol, 1,2-ethylhexyldiol, 1,5-pentanediol, 1,10-decanediol, 1,3-cyclohexanedimethanol, 1,4-cyclohexanedimethanol (CHDM), glycerine, trimethylolpropane, and combinations thereof.

6. The methods of claim 1, wherein the reaction mixture comprises 1,4-butanediol, diethylene glycol, glycerin, and adipic acid.

7. The methods of claim 1, wherein the dialkyl carbonate containing reaction mixture comprises less than 2,000 ppm water.

8. The method of claim 1, wherein the first amount of dialkyl carbonate is between 5 wt. % and 30 wt. % of the total amount of dialkyl carbonate added to the reaction mixture.

9. The methods of claim 1, wherein the second amount of dialkyl carbonate is between 70 wt. % and 95 wt. % of the total amount of dialkyl carbonate added to the reaction mixture.

10. The method of claim 1, wherein the transesterification catalyst is selected from the group comprising terbium-based catalysts, titanium-based catalysts, and tin-based catalysts.

11. The method of claim 1, wherein the reacting one or more alcohols having an OH functionality of two or more with an organic diacid is performed at a first temperature and the adding a first amount of dialkyl carbonate is performed at a second temperature less than the first temperature.

12. The method of claim 1, wherein the dialkyl carbonate is dimethyl carbonate (DMC).

* * * * *